United States Patent
Pareek et al.

(10) Patent No.: US 10,685,575 B1
(45) Date of Patent: Jun. 16, 2020

(54) METHOD AND SYSTEM FOR AVOIDING COLLISION BETWEEN INSPECTION DEVICES DURING INSPECTION OF AN AREA

(71) Applicant: Wipro Limited, Bangalore (IN)

(72) Inventors: Nikhil Pareek, Bangalore (IN); Vinod Pathangay, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/370,826

(22) Filed: Mar. 29, 2019

(30) Foreign Application Priority Data

Mar. 29, 2019 (IN) .............................. 201941012478

(51) Int. Cl.
| | |
|---|---|
| *G08G 9/02* | (2006.01) |
| *G06T 7/00* | (2017.01) |
| *G06T 7/70* | (2017.01) |
| *H04N 5/225* | (2006.01) |

(52) U.S. Cl.
CPC ............. *G08G 9/02* (2013.01); *G06T 7/0002* (2013.01); *G06T 7/70* (2017.01); *G06T 2207/20081* (2013.01); *G06T 2207/20221* (2013.01); *G06T 2207/30241* (2013.01); *H04N 5/2253* (2013.01)

(58) Field of Classification Search
CPC ..................... G06T 7/70; G06T 7/0002; G06T 2207/20081; G06T 2207/20221; G06T 2207/30241; G08G 9/02; H04N 5/2253
See application file for complete search history.

(56) References Cited

U.S. PATENT DOCUMENTS

| | | | |
|---|---|---|---|
| 2015/0284010 A1 | 10/2015 | Beardsley | |
| 2017/0225321 A1* | 8/2017 | Deyle | ................... B25J 19/023 |

FOREIGN PATENT DOCUMENTS

| | | |
|---|---|---|
| CN | 103144770 A | 6/2013 |
| CN | 106444423 A | 2/2017 |

* cited by examiner

*Primary Examiner* — Anner N Holder
(74) *Attorney, Agent, or Firm* — Finnegan, Henderson, Farabow, Garrett & Dunner, LLP (57) ABSTRACT

Disclosed herein are methods and collision avoidance systems and devices for avoiding collision between inspection devices during inspection of an area. In an embodiment, spatial information of the area, dynamically received from each inspection device, is used for creating current local map for each inspection device. Subsequently, a global map of area is generated using local maps and each inspection device is localized within the global map for identifying current location of the inspection devices. Thereafter, sub-paths for navigating each inspection device are estimated based on global map and current location of the inspection devices, validated for collision avoidance and provided to corresponding inspection devices. The inspection devices navigate across the area using the sub-paths and complete inspection of the area. In some embodiments, the present disclosure helps in faster and accurate inspection of the area by inspecting the area using concurrently operated inspection devices.

15 Claims, 6 Drawing Sheets

METHOD AND SYSTEM FOR AVOIDING COLLISION BETWEEN INSPECTION DEVICES DURING INSPECTION OF AN AREA

This application claims the benefit of Indian Patent Application Serial No. 201941012478 filed Mar. 29, 2019 which is hereby incorporated by reference in its entirety.

FIELD

The present subject matter is, in general, related to automated inspection and more particularly, but not exclusively, to method and system for avoiding collision between inspection devices during inspection of an area.

BACKGROUND

Traditionally, several indoor inspection tasks such as stock checking in warehouses or inspection of retail stores are done manually and hence are time-consuming. Also, manual inspection processes may not be efficient as they require the person to move across all the locations and physically inspect all the items stored at different levels/heights.

There exist several semi-automated inspection methods, which address some issues of the manual inspection process. According to one of the semi-automated inspection methods, a person has to move around the inspection area while taking multiple images of the inspection with an imaging device. Subsequently, the images are analyzed manually or using image analytics algorithms to detect items/objects in the inspection area. However, these semi-automated inspection methods have the disadvantage of inaccurate localization and often require an elaborate infrastructure setup for localization. Further, some of the automated inspection methods use robotic devices such as an automated ground vehicle, which may be programmed to autonomously traverse around the inspection area and capture multiple images of the inspection area. However, such methods have disadvantages that the objects stored at different level/heights cannot be imaged from the ground vehicle.

In view of the above limitations, present-day inspection methods make use of automated inspection devices that may be operated from various heights and configured to capture multiple images of the inspection area to perform the indoor inspection tasks. However, for large inspection areas, using a single automated inspection device may not be feasible due to limitation of battery life and computational capacity of the automated inspection device. Also, inspecting a large inspection area by a single inspection device may take a lot of time. Hence, it may be advantageous to use multiple automated inspection devices to concurrently inspect the inspection area. Accordingly, a mechanism for planning and coordinating concurrent navigation of the multiple automated inspection devices may be essential.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for avoiding collision between inspection devices during inspection of an area. The method comprises receiving, by a collision avoidance system, spatial information of the area from each of a plurality of inspection devices, initialized for inspecting the area. Each of the plurality of inspection devices navigate across a plurality of hops and the spatial information is received at beginning of each of the plurality of hops. Further, the method comprises creating a current local map for each of the plurality of inspection devices based on the spatial information of a current hop of the plurality of hops of each of the plurality of inspection devices. Thereafter, the method comprises generating a current global map of the area by merging the current local map of each of the plurality of inspection devices with a previous global map of the area. The previous global map corresponds to previous hops of the plurality of hops of each of the plurality of inspection devices. Subsequently, the method comprises localizing each of the plurality of inspection devices within the current global map for determining a current location of each of the plurality of inspection devices. Upon localizing, the method comprises estimating one or more sub-paths for navigating each of the plurality of inspection devices from the current hop to a subsequent hop of the plurality of hops, by analyzing the current global map and the current location of each of the plurality of inspection devices using a pre-trained path estimation model. Each of the one or more sub-paths are validated for eliminating possibility of collisions among the plurality of inspection devices in the subsequent hop. Finally, the method comprises providing each of the one or more sub-paths to each of the plurality of inspection devices for avoiding the collision between the plurality of inspection devices during inspection of the area.

Further, the present disclosure relates to a collision avoidance system for avoiding collision between inspection devices during inspection of an area. The collision avoidance system comprises a processor and a memory. The memory is communicatively coupled to the processor and stores processor-executable instructions, which on execution, cause the processor to receive spatial information of the area from each of a plurality of inspection devices, initialized for inspecting the area. Each of the plurality of inspection devices navigate across a plurality of hops and the spatial information is received at beginning of each of the plurality of hops. Thereafter, the instructions cause the processor to create a current local map for each of the plurality of inspection devices based on the spatial information of a current hop of the plurality of hops of the each of the plurality of inspection devices. Subsequently, the instructions cause the processor to generate a current global map of the area by merging the current local map of each of the plurality of inspection devices with a previous global map of the area. The previous global map corresponds to previous hops of the plurality of hops of each of the plurality of inspection devices. Further, the instructions cause the processor to localize each of the plurality of inspection devices within the current global map for determining a current location of each of the plurality of inspection devices. Upon localizing, the instructions cause the processor to estimate one or more sub-paths for navigating each of the plurality of inspection devices from the current hop to a subsequent hop of the plurality of hops, by analyzing the current global map and the current location of each of the plurality of inspection devices using a pre-trained path estimation model. Each of the one or more sub-paths are validated for eliminating possibility of collisions among the plurality of inspection devices in the subsequent hop. Finally, the instructions cause the processor to provide each of the one or more sub-paths to each of the plurality of inspection devices for avoiding the collision between the plurality of inspection devices during inspection of the area.

Furthermore, the present disclosure relates to a non-transitory computer readable medium including instructions stored thereon that when processed by at least one processor cause a collision avoidance system to perform acts of receiving spatial information of the area from each of a plurality of inspection devices, initialized for inspecting the area. Each of the plurality of inspection devices navigate across a plurality of hops and the spatial information is received at beginning of each of the plurality of hops. Thereafter, the instructions cause the at least one processor to create a current local map for each of the plurality of inspection devices based on the spatial information of a current hop of the plurality of hops of the each of the plurality of inspection devices. Subsequently, the instructions cause the at least one processor to generate a current global map of the area by merging the current local map of each of the plurality of inspection devices with a previous global map of the area. The previous global map corresponds to previous hops of the plurality of hops of each of the plurality of inspection devices. Further, the instructions cause the at least one processor to localize each of the plurality of inspection devices within the current global map for determining a current location of each of the plurality of inspection devices. Upon localizing, the instructions cause the at least one processor to estimate one or more sub-paths for navigating each of the plurality of inspection devices from the current hop to a subsequent hop of the plurality of hops, by analyzing the current global map and the current location of each of the plurality of inspection devices using a pre-trained path estimation model. Each of the one or more sub-paths are validated for eliminating possibility of collisions among the plurality of inspection devices in the subsequent hop. Finally, the instructions cause the at least one processor to provide each of the one or more sub-paths to each of the plurality of inspection devices for avoiding the collision between the plurality of inspection devices during inspection of the area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and collision avoidance system for avoiding collision between inspection devices during inspection of an area. In an embodiment, the present disclosure discloses use of multiple inspection devices to concurrently complete the inspection in lesser time as compared to the time taken by a single inspection device. As an example, the inspection device may be an airborne device such as a drone. Specifically, the present disclosure aims at addressing two main challenges associated with simultaneously using multiple inspection devices for inspecting the area. Firstly, the disclosure discloses aspect of aggregating data/images acquired by multiple inspection devices to form a common and/or global representation of the inspection area. Secondly, the disclosure discloses aspects related to planning and coordination of traversal/navigation paths for each of the inspection devices. Consequently, the disclosure discloses aspect of dynamically adapting navigation paths of the inspection devices to different inspection areas with different layouts and dimensions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
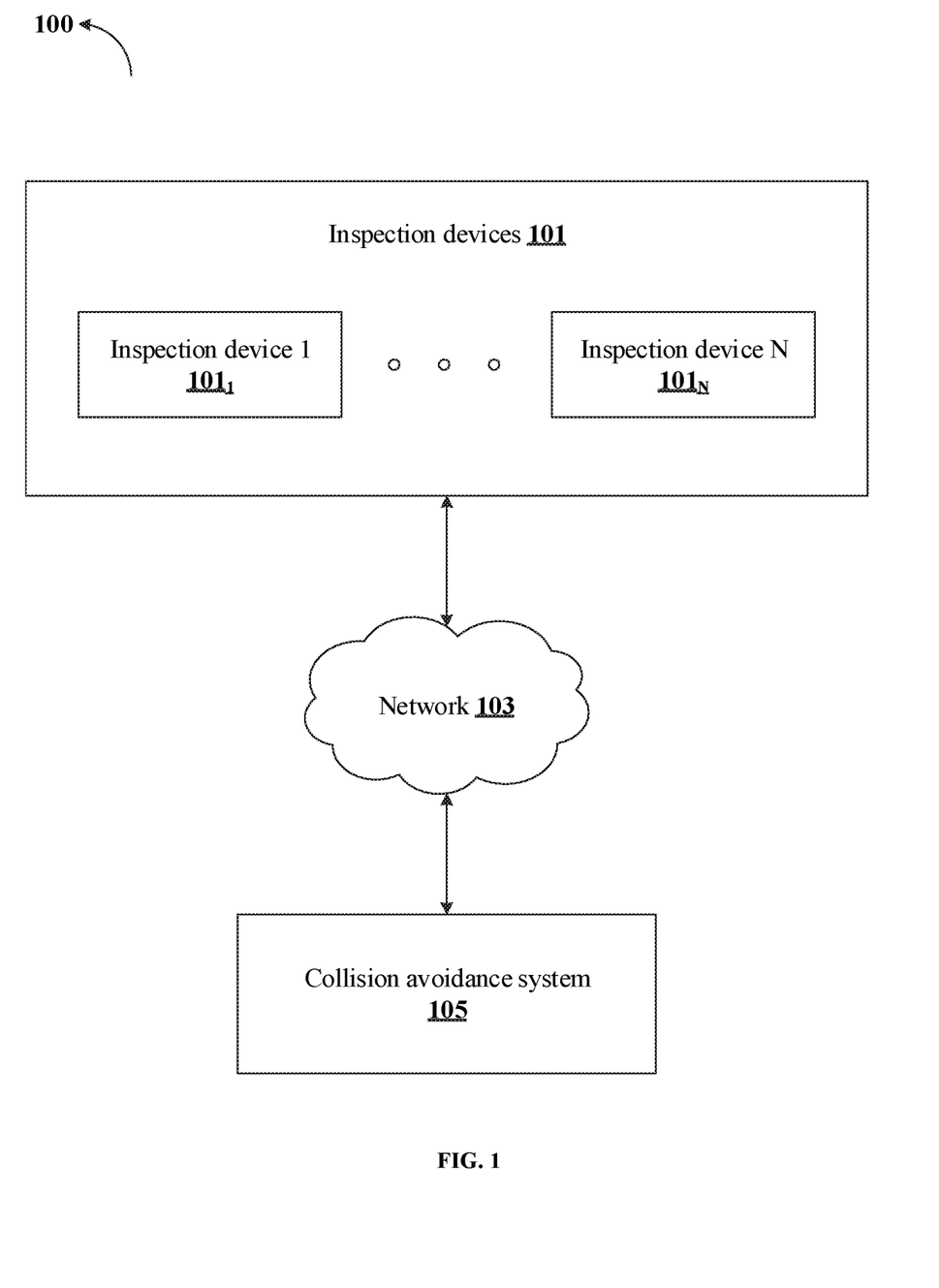
FIG. 1 illustrates an exemplary environment for avoiding collision between inspection devices during inspection of an area in accordance with some embodiments of the present disclosure.

FIG. 1 illustrates an exemplary environment for avoiding collision between inspection devices 101 during inspection of an area in accordance with some embodiments of the present disclosure.

In an embodiment, the environment 100 may include, without limiting to, a plurality of inspection devices 101, namely, inspection device 101<sub>1</sub> to inspection device 101N (collectively referred as inspection devices 101), a communication network 103 and a collision avoidance system 105. The plurality of inspection devices 101 and the collision avoidance system 105 are communicatively connected through the communication network 103.

In an embodiment, the environment 100 may be a warehouse, a production site or an inventory storage, in which a large of items or objects stored and need to be inspected at regular periods. In an embodiment, the environment 100 may be an indoor environment or an outdoor environment.

In an embodiment, each of the plurality of inspection devices 101 may be an airborne device which is capable of autonomously moving and/or navigating within the environment and capturing images of required locations within the environment. In an embodiment, each of the plurality of inspection devices 101 may be configured and/or mounted with one or more sensors and image capturing devices for collecting spatial information of the data and images of the environment, respectively.

In an embodiment, the network 103 may be a wireless communication network such as Wi-Fi, Bluetooth® and the like. In an embodiment, the network 103 may be used for transmitting, in real-time, spatial information collected by each of the plurality of inspection devices 101 to the collision avoidance system 105. Further, the network 103 may be also used for transmitting one or more instructions, commands or one or more sub-paths from the collision avoidance system 105 to the plurality of inspection devices 101.

In an embodiment, the collision avoidance system 105 may be a computing device such as, without limiting to, a desktop computer, a laptop, a server, a smartphone, a Personal Digital Assistant (PDA) and the like. Further, the collision avoidance system 105 may be associated with one or more input/output devices such as a keyboard and a display unit for receiving information and/or providing information to a user associated with the collision avoidance system 105. As an example, the user may use the keyboard to provide information such as dimensions of an area to be inspected within the environment to the collision avoidance system 105. Similarly, the collision avoidance system 105 may display one or more images or inspection results on the display unit for providing the inspection results to the user.

In an embodiment, the plurality of inspection devices 101 may be initialized upon receiving an inspection request and dimensions of the area to be inspected, from the user. Upon initialization, each of the plurality of inspection devices 101 may move to a predefined position and wait to receive further commands/instructions from the collision avoidance system 105 to begin inspection of the area. In an embodiment, the collision avoidance system 105 may initiate navigation of the plurality of inspection devices 101 by providing one or more sub-paths to each of the plurality of inspection devices 101. As an example, each of the one or more sub-paths may correspond to a part of the navigation information, which includes a complete path to be traversed by the plurality of inspection devices 101 during inspection of the area. Further, the predefined position of the plurality of inspection devices 101 may be a hovering position, which is at a distance equal to half of the height of the area.

In an embodiment, after receiving the one or more sub-paths, each of the plurality of inspection devices 101 may start navigating across a plurality of hops, until each portion of the area to be inspected is covered/inspected by at least one of the plurality of inspection devices 101. Each hop of the plurality of hops may correspond to each sub-path of the one or more sub-paths provided to the plurality of inspection devices 101. That is, the plurality of inspection devices 101 may be considered to have completed one hop of the navigation, when the plurality of inspection devices have successful traversed through the corresponding sub-path. Further, each of the plurality of inspection devices 101 may collect the spatial information of the area at beginning of each of the plurality of hops, using the one or more sensors and the image capturing devices associated with the plurality of inspection devices 101. Also, the plurality of inspection devices 101 may transmit the collected spatial information of the area to the collision avoidance system 105 for further analysis.

Thereafter, the collision avoidance system 105 may create a current local map for each of the plurality of inspection devices 101 based on the spatial information of a current hop of the plurality of hops of each of the plurality of inspection devices 101. That is, the collision avoidance system 105 may create the current local maps corresponding to each of the plurality of inspection devices 101 using the spatial information received from each of the plurality of inspection devices 101, at the start of each hop taken by the plurality of inspection devices 101. In an embodiment, the current local map may indicate location information corresponding to a current location of each of the plurality of inspection devices 101.

In an embodiment, upon creating the current local maps, the collision avoidance system 105 may generate a current global map of the area by merging the current local maps received from each of the plurality of inspection devices 101 with a previous global map of the area. However, when the plurality of inspection devices 101 are being initialized for the first time and/or at the beginning of the inspection process, there may not be a previous global map of the area. In such instances, the current global map of the area may be generated by aggregating each of the one or more current local maps received from the plurality of inspection devices 101. Thereafter, in a subsequent iteration and/or during subsequent navigation of the plurality of inspection devices 101, the current global map be used as the previous global map of the area. The previous global map may correspond to previous hops traversed by each of the plurality of inspection devices 101. Thus, a current global map of the area may be used for generating a subsequent global map of the area. In an embodiment, the current global map of the area may provide a global overview of the area, along with an indication on relative position of each of the plurality of inspection devices 101 with respect to each of the other inspection devices 101, at the beginning of a subsequent hop.

In an embodiment, upon generating the current global map of the area, the collision avoidance system 105 may localize each of the plurality of inspection devices 101 within the current global map for determining a current location of each of the plurality of inspection devices 101. Subsequently, the collision avoidance system 105 may estimate one or more sub-paths for navigating each of the plurality of inspection devices 101 by analysing the current global map and the current location of each of the plurality of inspection devices 101. In an embodiment, analysis of the current global map and the current location of each of the plurality of inspection devices 101 may be performed using a pre-trained path estimation model configured in the collision avoidance system 105. As an example, the pre-trained path estimation model may be trained on historical data related one or more sub-paths traversed by the plurality of inspection devices 101 within an inspection area of similar dimensions.

In an embodiment, after estimating the one or more sub-paths, the collision avoidance system 105 may validate each of the one or more sub-paths for eliminating possibility of collisions among the plurality of inspection devices 101 in the subsequent hop. That is, the collision avoidance system 105 may identify and eliminate the sub-paths that may cause at least two inspection devices 101 to reach the same position in their subsequent hops. Further, the collision avoidance system 105 may identify one or more alternative sub-paths for replacing the one or more sub-paths that are identified and eliminated.

In an embodiment, upon successful validation of each of the one or more sub-paths, the collision avoidance system 105 may provide each of the one or more sub-paths to each of the plurality of inspection devices 101 for navigating each of the plurality of inspection devices 101. Thereafter, each of the plurality of inspection devices 101 may traverse through the one or more sub-paths received for concurrently inspecting the area.

In an embodiment, the process of creating the local maps, generating the global map, localizing the inspection devices 101 and then estimating the sub-paths for the inspection devices 101 may be repeated at the beginning of each hop of the plurality of hops traversed by the inspection devices 101. That is, the collision avoidance system 105 may continuously monitor and coordinate the navigation of each of the plurality of inspection devices 101 until the inspection of the area is completed.

Figure 2:
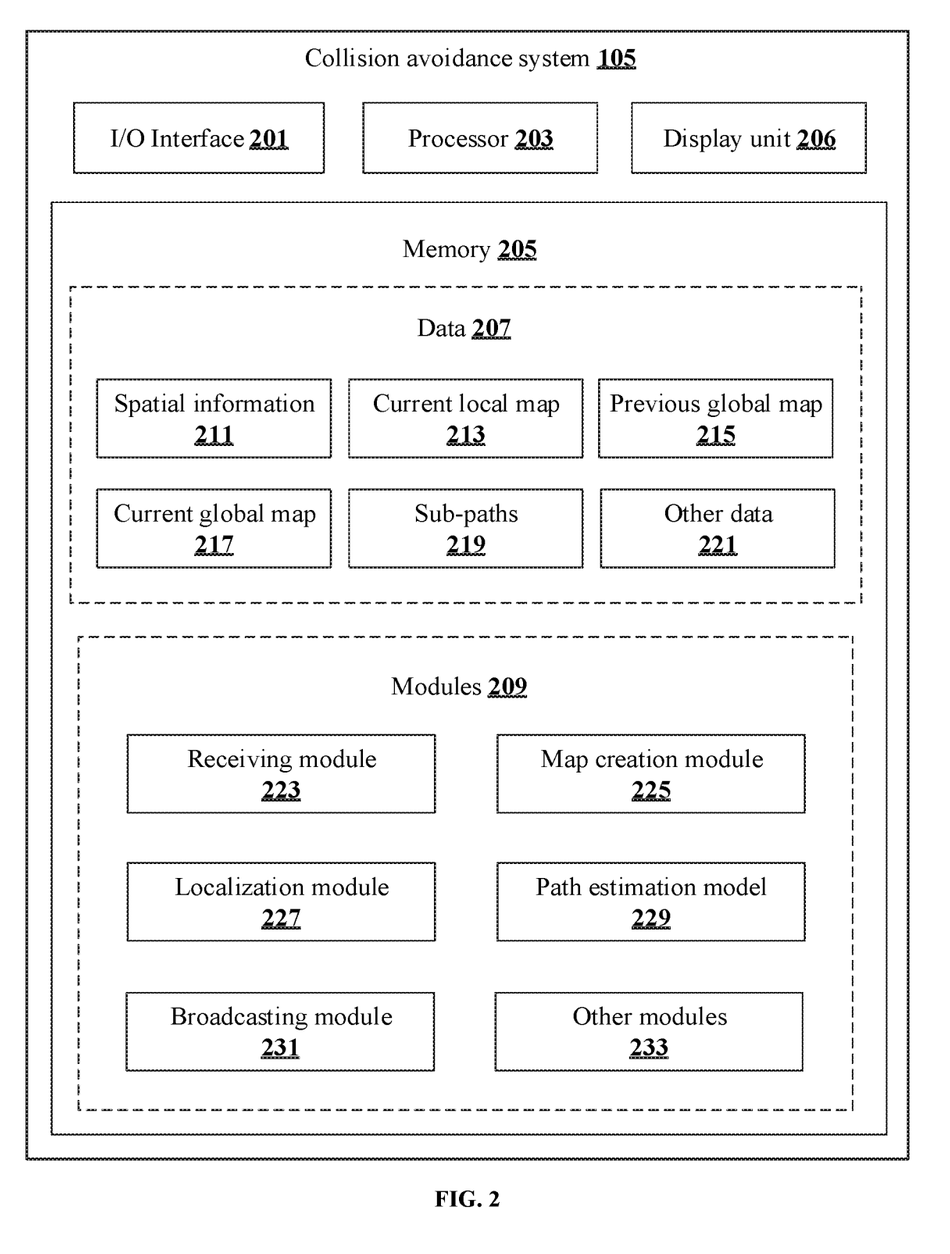
FIG. 2 shows a detailed block diagram of a collision avoidance system in accordance with some embodiments of the present disclosure.

FIG. 2 shows a detailed block diagram illustrating a collision avoidance system 105 in accordance with some embodiments of the present disclosure.

In some implementations, the collision avoidance system 105 may include an I/O interface 201, a processor 203, a memory 205 and a display unit 206. The I/O interface 201 may be used to communicatively interface the collision avoidance system 105 with each of plurality of inspection devices 101 for receiving spatial information 211 of an area being inspected by the plurality of inspection devices 101. Further, the I/O interface 201 may be also used for broadcasting and/or transmitting one or more sub-paths 219 to each of the plurality of inspection devices 101. The memory 205 may be communicatively coupled to the processor 203 and may store data 207 and one or more modules 209. The processor 203 may be configured to perform one or more functions of the collision avoidance system 105 for avoiding collision between each of the plurality of inspection devices 101 during inspection of the area, using the data 207 and the one or more modules 209. The display unit 206 may be used for displaying various information including, without liming to, a global map of the area, current location of each of the plurality of inspection devices 101 on the global map of the area, one or more images of the area and the like to a user associated with the collision avoidance system 105.

In an embodiment, the data 207 may include, without limitation, spatial information 211, current local map 213, previous global map 215, current global map 217, sub-paths 219 and other data 221. In some implementations, the data 207 may be stored within the memory 205 in the form of various data structures. Additionally, the data 207 may be organized using data models, such as relational or hierarchical data models. The other data 221 may store various temporary data and files generated by one or more modules 209 while performing various functions of the collision avoidance system 105. As an example, the other data 221 may include, without limiting to, plurality of training images of the area, location and dimension information of the area, pre-trained training models and the like.

In an embodiment, the spatial information 211 may be information related to the area being inspected by each of the plurality of inspection devices 101. As an example, the spatial information 211 may include, without limiting to, data collected by one or more sensors and the one or more images captured by the image capturing devices associated with the plurality of inspection devices 101. The spatial information 211 may be used to determine information related to surroundings of each of the plurality of inspection devices 101 and may be collected at the beginning of each hop of the plurality of hops navigated by the plurality of inspection devices 101.

In an embodiment, the current local map 213 may be created for each of the plurality of inspection devices 101 based on the spatial information 211 received from each of the plurality of inspection devices 101. The current local map 213 of an inspection device may include information related to a current location of the inspection device at a current hop and information related to surrounding space of the current location of the inspection device.

In an embodiment, the previous global map 215 may include information related to previous locations of the plurality of inspection devices 101 and the one or more sub-paths previously traversed by each of the plurality of inspection devices 101, determined during a previous hop traversed by each of the plurality of inspection devices 101. Further, the previous global map 215 may be obtained by merging the previous local maps and other historical global maps of each of the plurality of inspection devices 101. Similarly, the current global map 217 of the area may be generated by merging the current local maps 213 of each of the plurality of inspection devices 101 with the previous global map 215. Essentially, the global map may continue to grow as the plurality of inspection devices 101 navigate through new hops and/or sub-paths 219. At any given point of time, the current global map 217 may indicate the relative locations of each of the plurality of inspection devices 101 within the area.

In an embodiment, each of the one or more sub-paths 219 may correspond to a part of the navigation path, which needs to be traversed for completely inspecting the area. The one or more sub-paths 219 are provided to each of the plurality of inspection devices 101 for navigating each of the plurality of inspection devices 101 across a plurality of hops. As an example, a sub-path may be an instruction such as 'move 0.4 meter and elevate by 0.2 meter'. In an embodiment, the one or more sub-paths 219 may be validated for eliminating one or more overlapping sub-paths 219 that may lead to collision among the plurality of inspection devices 101. After validation, the one or more sub-paths 219 may be provided to corresponding each of the plurality of inspection devices 101 through the network 103. In some embodiments, the one or more sub-paths 219 may be broadcasted on a common communication channel associated with each of the plurality of inspection devices 101 for concurrently providing the one or more sub-paths 219 for each of the plurality of inspection devices 101.

In an embodiment, the data 207 may be processed by the one or more modules 209. In some implementations, the one or more modules 209 may be communicatively coupled to the processor 203 for performing one or more functions of the collision avoidance system 105. In an implementation, the one or more modules 209 may include, without limiting to, a receiving module 223, a map creation module 225, a localization module 227, a path estimation model 229, a broadcasting module 231 and other modules 233.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 233 may be used to perform various miscellaneous functionalities of the collision avoidance system 105. It will be appreciated that such one or more modules 209 may be represented as a single module or a combination of different modules.

In an embodiment, the receiving module 223 may be configured to receive the spatial information 211 of the area from each of the plurality of inspection devices 101. In an embodiment, the receiving module 213 may receive the spatial information 211 at the beginning of each of the plurality of hops navigated by each of the plurality of inspection devices 101.

In an embodiment, the map creation module 225 may be used for creating the local maps for each of the plurality of inspection devices 101 and the global map of the area. In an implementation, the map creation module 225 may create the local maps for each of the plurality of inspection devices 101 by running a predefined localization and navigation technique on the one or more image frames received from each of the plurality of inspection devices 101. As an example, the localization and navigation techniques used for creating the local maps may include, without limitation, Simultaneous Localization and Mapping (SLAM) algorithm. Alternatively, any of the existing object localization and navigation technique may be used for creating the local maps. In an embodiment, SLAM may be used since it enables the plurality of inspection devices 101 to simultaneously inspect and navigate along the area, without assistance from Global Positioning System (GPS) or other external sensors for localization of the area.

In an embodiment, the plurality of inspection devices 101 may scan through the respective surroundings using a "look-around" maneuver function, which enables the inspection devices 101 to capture a 360-degree video of the surrounding space. Subsequently, the video of the surroundings of each of the plurality of inspection devices 101 may be provided to SLAM for generating a 3D point cloud map of surrounding space of the plurality of inspection devices 101. That is, the input to the SLAM may be a set of image frames or a 360-degree video of the surroundings and corresponding sensor values, and the output of SLAM may be a 3D point cloud map and/or local map of the scene around each of the plurality of inspection devices 101.

In an embodiment, the SLAM may be run separately on the one or more image frames received separately from each of the plurality of inspection devices 101 for creating distinct local maps corresponding to each of the plurality of inspection devices 101. In other words, the local map of an inspection device may be defined as a map created using a set of frames and sensor data captured by the sensors and image capturing devices configured in the same inspection device.

In an embodiment, the map creation module 225 may generate the global map of the area by aggregating the local maps generated by each of the plurality of inspection devices 101 and merging them with a previous global map 215 of the area. In an embodiment, the global map may be defined as an aggregation of multiple local maps generated using a single inspection device at different time instances. Alternatively, the global map may also be generated by aggregating multiple local maps created for multiple inspection devices 101 at same or different time instances.

In an embodiment, the local maps corresponding to each of the plurality of inspection devices 101 may be merged or aggregated based on visual correspondences and/or visual similarities between the local maps. As an example, for a set of 'N' distinct local maps obtained at any time instant, the map creation module 225 may perform N×(N−1) comparisons and assign a continuity score, such as Local Map Continuity (LMC) score, for each of the adjacent local maps based on the visual similarity among the adjacent local maps. Thereafter, the adjacent local maps may be merged based on the continuity score. Ideally, since each of the plurality of inspection devices 101 start moving from adjacent positions, the local maps corresponding to each of the plurality of inspection devices 101 may merge into a single aggregated global map as there will be continuity for adjacent local maps.

In an embodiment, the LMC score may be calculated using a brute force technique which uses exhaustive matches and visual similarity of the points from any two local maps. As an example, the LMC may be defined by equation (1) below:

$$LMC = \mathrm{maxlog} \frac{\sum s(p_i, p_j)}{P} \qquad (1)$$

Wherein, $s|p_i, p_j|$ indicates the visual similarity between best matching points between the local maps 'i' and 'j'.

In an embodiment, if the LMC score for two adjacent local maps is greater than an empirical threshold value, then the local maps be considered visually related and merged together. The above process may be repeated for each pair of the local maps. In an embodiment, the current global map 217 may also be aggregated with the previous global map 215 using the above process.

In an embodiment, the localization module 227 may be used for localizing each of the plurality of inspection devices 101 on the current global map 217 of the area for determining a current location of each of the plurality of inspection devices 101 in the area.

In an embodiment, the path estimation model 229 may be used for estimating the one or more sub-paths 219 for each of the plurality of inspection devices 101. The path estimation model 229 may use the current global map 217 and the current location of each of the plurality of inspection devices 101 to generate sub-path motion commands for each of the plurality of inspection devices 101. In an embodiment, the one or more sub-paths 219 estimated by the path estimation model 229 may be in the form of—go left/right/up/down by a certain distance or rotate by a certain angle and the like.

Additionally, the path estimation model 229 may be configured for validating each of the one or more sub-paths 219 for determining and eliminating overlaps in paths and/or collisions among the plurality of inspection devices 101. The one or more sub-paths 219 may be validated for possible collisions using a pre-trained reinforcement learning model associated with the path estimation model 229. In an embodiment, the reinforcement learning model may be trained to estimate an alternative sub-path for each of the plurality of inspection devices 101 when possibility of a collision is determined. The input to the reinforcement model may be the current location of each of the plurality of inspection devices 101 and the extent of inspection coverage required within the area.

In an embodiment, the reinforcement learning model may be trained and updated with a 'positive reward' for completing the inspection of the area without resulting in any collision between the plurality of inspection devices 101. Similarly, the reinforcement learning model may be updated with a 'negative reward' for redundant inspection by at least one inspection device in the area which is already inspected by the other inspection devices 101. Also, the 'negative reward' may be assigned when the estimated sub-paths 219 result in a high probability of collision among the plurality of inspection devices 101. That is, during the training, the reinforcement model may be trained for an optimum multi-device control policy to predict the subsequent sub-paths 219 in any unseen and/or unstructured portion of the area to be inspected. Further, during actual deployment and/or real-time operation of the inspection devices 101, the already trained reinforcement learning model may be used to predict the subsequent optimum sub-paths 219 for each of the plurality of inspection devices 101 based on the current global map 217, the current locations of each of the plurality of inspection devices 101 and extent of uninspected region of the area.

In an embodiment, if the possibility of collision is detected among the one or more sub-paths 219, then the sub-paths 219 may be invalidated, and new sub-paths 219 may be predicted again. Due to randomized nature of the path estimation model 229, the newly predicted sub-paths 219 may be different in the next iteration. As an example, suppose two inspection devices 101 are assigned with sub-paths 219 "move right by 0.5 meter" and "move left by 0.6 meter" respectively. Also, suppose the two inspection devices 101 are located at a distance of 1 meter apart. In such a scenario, there may be a possibility of collision between the two inspection devices 101. Accordingly, the path estimation model 229 may invalidate the sub-path assigned to one of the two inspection devices 101 and may generate a new sub-path for avoiding collision between the inspection devices 101. In the above example, the path estimation model 229 may invalidate the path "move right by 0.5 meter" and predict a new path such as "move straight by 0.5 meter".

In an embodiment, the broadcasting module 231 may be used for providing and/or broadcasting each of the one or more sub-paths 219 estimated by the path estimation model 229 to corresponding each of the plurality of inspection devices 101 for concurrently navigating each of the plurality of inspection devices 101. In an embodiment, if there are more predicted sub-paths 219 than the number of inspection devices 101 which are actively navigating, then the broadcasting module 231 may assign the unassigned sub-paths 219 to one or more new inspection devices 101. The one or more new inspection devices 101 may be the back-up inspection devices, which are in an idle state and/or not currently being used for inspecting the area. Accordingly, suitable initialization commands may be provided to the new inspection device for navigating using the assigned sub-paths 219.

Alternatively, there may be instances where some of the actively navigating inspection devices 101 do not get sub-paths 219. In such instances, the broadcasting module 231 may verify if the number of sub-paths 219 predicted is less than the number of active inspection devices 101. Thereafter, if the inspection device does not get a sub-path for more than 3 hops, then the inspection device may be navigated back to the predefined location such as the 'home position'. Here, the broadcasting module 231 may transmit a pre-calculated and collision-validated trajectory to the inspection device to navigate the inspection device back to the 'home position'.

In an embodiment, upon completion of the inspection process, the collision avoidance system 105 may generate inspection results and display them on the display unit 206 associated with the collision avoidance system 105. Here, the collision avoidance system 105 may generate a list of stitched images of objects and items within the area, captured by the one or more image capturing devices of the plurality of inspection devices 101, for generating the inspection results. The inspection results may include, without limiting to, values of labels of items stored in the area, extent of empty spaces in the area, number of items stored and the like. In an embodiment, only those images having a high Useful Inspection Frame (UIF) score may be used for generating the inspection results. The UIF score may be calculated using a pre-trained machine learning model that is trained on images of all the items and labels that are to be detected in the area. As an example, the UIF score may be calculated using equation (2) below:

$$UIF = \sum_i d_i \qquad (2)$$

Wherein, $d_i$ indicates probability of detecting an object 'i' in an image frame.

In an embodiment, each stitched image of the inspected area may be interactively displayed on the display unit 206, along with a highlighted physical location in the global map of the area. Further, a user associated with the collision avoidance system 105 may use the inspection results displayed on the display unit 206 for required applications.

Figure 3:
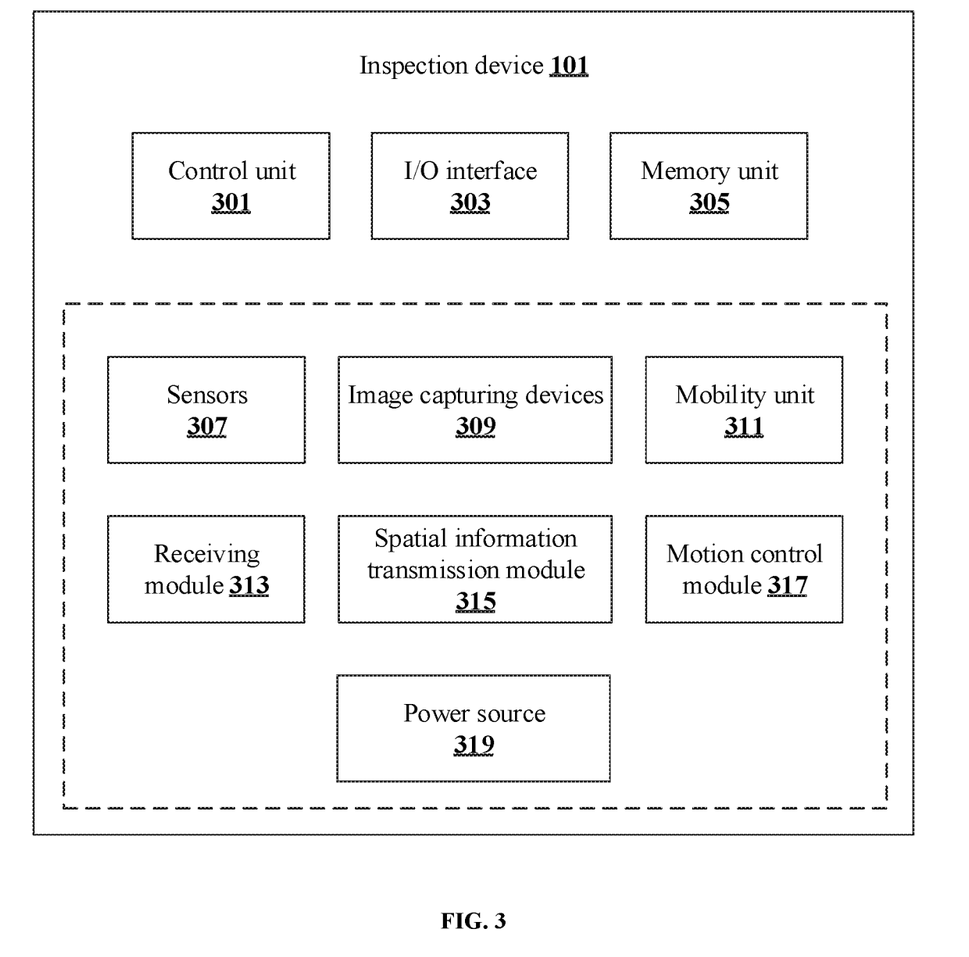
FIG. 3 shows a detailed block diagram of an inspection device in accordance with some embodiments of the present disclosure.

FIG. 3 shows a detailed block diagram illustrating an inspection device in accordance with some embodiments of the present disclosure.

In some embodiment, each of the plurality of inspection devices 101 may have similar configurations and computing capabilities. Alternatively, each of the plurality of inspection devices 101 may be of different configurations and computing capabilities. In an implementation, as shown in FIG. 3, each of the plurality of inspection devices 101 may comprise a control unit 301, an I/O interface 303, a memory 305, sensors 307, image capturing devices 309, a mobility unit 311, a receiving module 313, a spatial information transmission module 315, a motion control module 317 and a power source 319.

In an embodiment, the control unit 301 may be configured for performing all the functions of the inspection device based on instructions/commands received from the collision avoidance system 105. In an embodiment, the I/O interface 303 of the inspection device may be used to connect to a wired and/or wireless communication network 103 for establishing a wired/wireless communication with the collision avoidance system 105 and other inspection devices 101. In an embodiment, the memory 305 unit may be used for storing information including, without limiting to, data collected by the sensors 307, images captured by the image capturing devices 309, one or more sub-paths 219 received from the collision avoidance system 105 and the like.

In an embodiment, the sensors 307 configured in the inspection device may assist the inspection device in controlling the navigation of the inspection device during the inspection. The sensors 307 may be used for collecting information such as dimensions of the area to be inspected, proximity or depth of obstacles and other inspection devices 101 within the area, inertial and velocity measurements and the like. In an embodiment, the sensors 307 may include, without limiting to, a proximity sensor, a depth sensor, a height sensor, a Light Detection and Ranging (LIDAR) sensor, Inertial Measurement Units (IMUs) and the like.

In an embodiment, the image capturing devices 309 may be mounted on peripheral surface of the inspection device. The image capturing devices 309 may be used for capturing real-time images of various locations of the area during inspection of the area. Each of the image capturing devices 309 may be configured to capture images at a predefined rate such as 5 frames per second to 60 frames per second. Alternatively, image capturing devices 309 may be configured to capture images of the area only when it is desired by the user.

In an embodiment, the mobility unit 311 may be responsible for physical movement and/or navigation of the inspection device during the inspection of the area. In an implementation, the mobility unit 311 may include, without limiting to, a motor assembly, an actuator, propellers, gears and the like.

In an embodiment, the receiving module 313 may be used for receiving the instructions/commands from the collision avoidance system 105 during the inspection of the area. Also, the receiving module 313 may be used for receiving one or more sub-paths 219 from the collision avoidance system 105. Similarly, the spatial information transmission module 315 may be configured to transmit spatial information 211 to the collision avoidance system 105. As an example, the spatial information 211 includes, without limiting to, sensor data, images of the area and location information related to a current location of the inspection device.

In an embodiment, the motion control module 317 may be configured to control the movement of the inspection device in accordance with the instructions/commands and/or one or more sub-paths 219 received from the collision avoidance system 105. The motion control module 317 may monitor, and control incremental motion of the inspection device based on the sub-paths 219 provided to the inspection device. For example, suppose the sub-path provided to the inspection device includes instructions such as 'move left for 0.5 meters and rotate clockwise by 90 degree'. Here, the motion control module 317 may translate the above instruction into a series of sub-path information such as 'turn left' 'move 0.5 meters', and then 'rotate clockwise by 90 degree'. Here, each part of the above sub-path information may correspond to a different hop of the plurality of hops traversed by the inspection device. Thus, the motion control module 317 helps in incremental navigation of the inspection device across the plurality of hops.

As an example, a sub-path instruction such as 'move-up by 0.4 meter' may be executed as a motion control command by the control unit 301 which may cause an increase in the propeller speed, for example by 100 rpm, till the height of the inspection device is increased by 0.4 meters. In an embodiment, execution of the navigation commands may be performed using a closed loop control logic that uses the height sensor to verify if the target height is reached. Similarly, other commands such as rotation may use one of the IMU sensors to execute the motion control in the closed loop.

In an embodiment, the power source 319 may be used for powering each component in the inspection device. The power source 319 may be a rechargeable power source or a replaceable power source.

In an implementation, each of the plurality of inspection devices 101 may be operated using a distributed computing platform. The distributed computing platform may be used for exchanging path information and coordinating navigation among the plurality of inspection devices 101. In such an implementation, the control unit 301 and memory 305 of each of the plurality of inspection devices 101 may be connected through a common wireless network interface such as Wi-Fi.

Figure 4A:
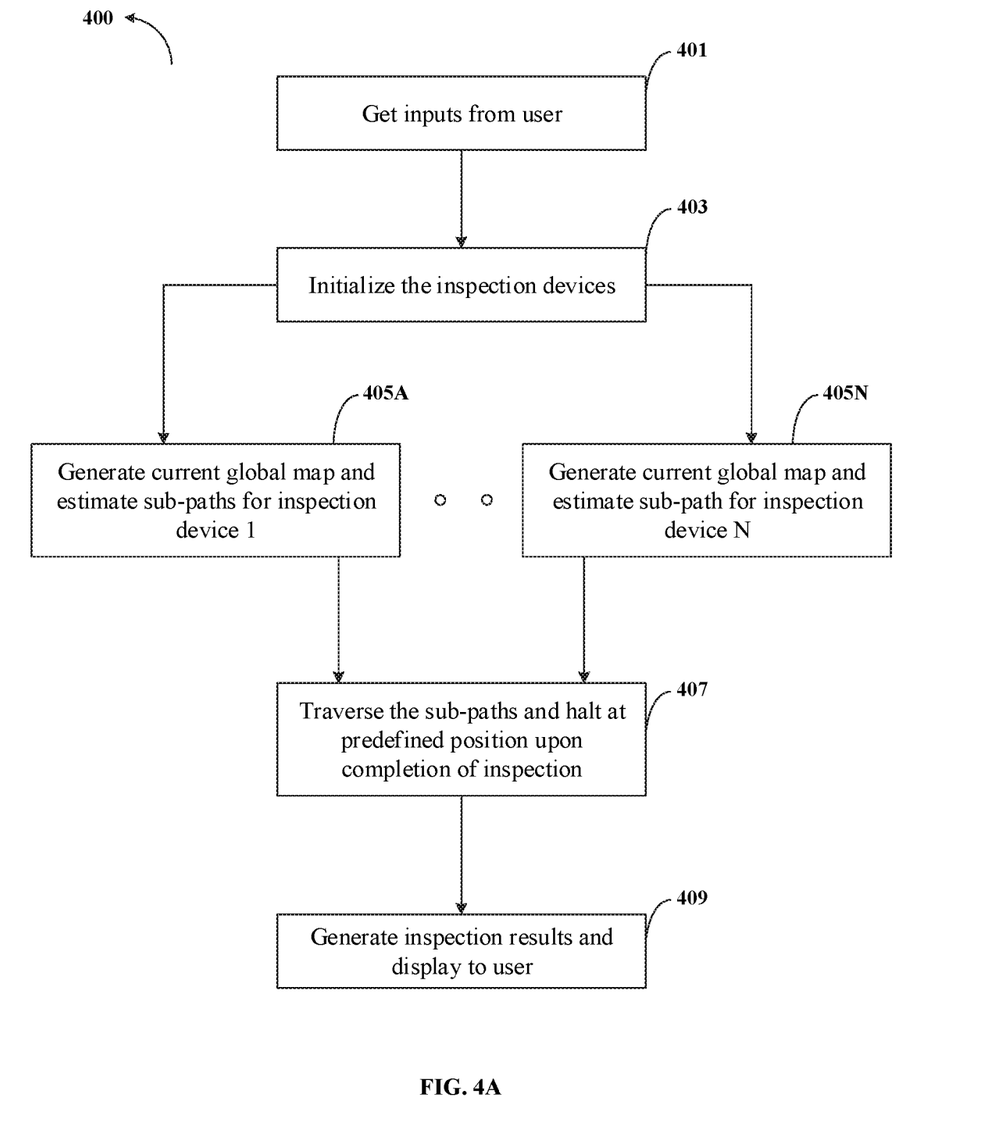
FIG. 4A shows a flowchart illustrating a method of inspecting an area in accordance with some embodiments of the present disclosure.

FIG. 4A shows a flowchart illustrating a method of inspecting an area in accordance with some embodiments of the present disclosure.

Method 400 illustrates various steps involved in inspecting an area using the collision avoidance system 105 and the plurality of inspection devices 101. Initially, at step 401, the method comprises receiving user inputs related to dimensions of floor and/or walls of the area in terms of approximate length and width of the floor area to be inspected. This may be a maximum range of the area to be inspected. In an embodiment, if there are any obstacles within the given range of area, then the search area may be dynamically truncated during the inspection process. Detection of obstacles and determination of the maximum range of the area may be performed using a pre-trained deep learning model configured in the collision avoidance system 105. Once the dimensions of the area to be inspected is determined, at step 403, the method comprises initializing each of the plurality of inspection devices 101 to start inspecting the area. In an embodiment, initializing the plurality of inspection device may include transmitting a take-off signal to the plurality of inspection devices 101. Upon receiving the take-off signal, the plurality of inspection devices 101 may elevate and hover at a fixed height, which is optimal for inspecting the area.

Subsequently, at steps 405A through 405N, the collision avoidance system 105 may generate a current global map 217 of the area by merging current local maps 213 corresponding to each of the plurality of inspection devices 101 with a previous global map 215 of the area. Further, the collision avoidance system 105 may estimate one or more sub-paths 219 for each of the plurality of inspection devices 101 based on the current global map 217 and a current location of each of the plurality of inspection devices 101. Thereafter, the collision avoidance system 105 may validate each of the one or more sub-paths for eliminating the possibilities of collision between the plurality of inspection devices 101. The method of avoiding collision between the plurality of inspection devices 101 is illustrated in detail in the description of FIG. 4B.

In an embodiment, once the one or more sub-paths 219 are estimated, validated and provided to the plurality of inspection devices 101, at step 407 of FIG. 4A, the plurality of inspection devices 101 may traverse the one or more sub-paths 219 for completing inspection of the area. In an embodiment, the inspection may be complete when there is no undiscovered area left within the area identified for inspection. In other words, the inspection may be complete when there are no new sub-paths 219 for traversing. In an embodiment, once the inspection is complete, each of the plurality of inspection devices 101 may return to a pre-defined location, indicating end of the inspection process. As an example, the predefined location may be a 'home location' or a location from which the plurality of inspection devices 101 have been initialized.

At step 409, the collision avoidance system 105 may generate inspection results based on the data and/or images received from each of the plurality of inspection devices 101. Further, the inspection results may be provided to a user by displaying the inspection results on a display unit 206 associated with the collision avoidance system 105. As an example, the inspection results may include, without limiting to, one or more images of the area, a count of the number of items/objects in the area and the like.

Figure 4B:
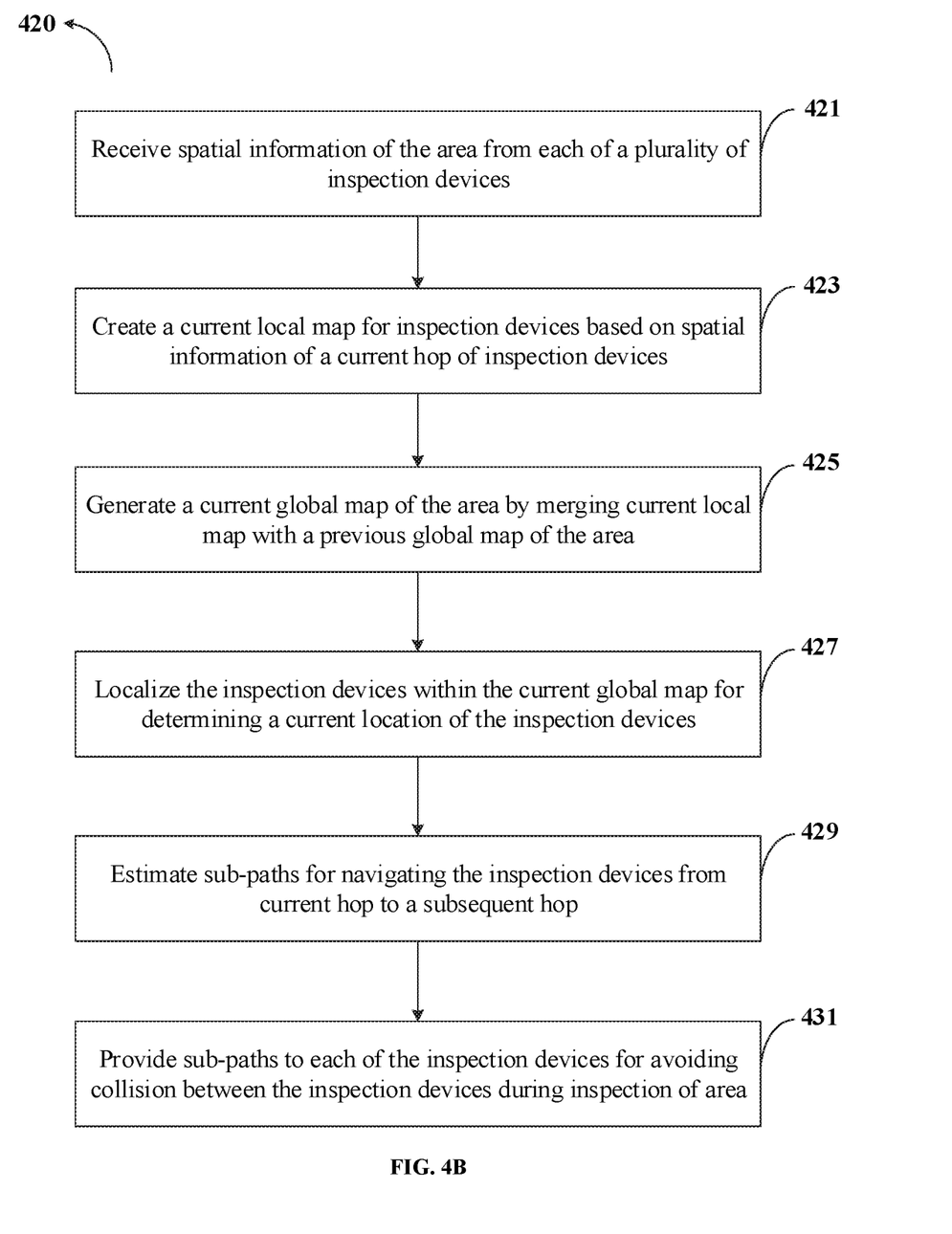
FIG. 4B shows a flowchart illustrating a method of avoiding collision between inspection devices during inspection of an area in accordance with some embodiments of the present disclosure.

FIG. 4B shows a flowchart illustrating a method of avoiding collision between inspection devices 101 during inspection an area in accordance with some embodiments of the present disclosure.

As illustrated in FIG. 4B, the method 420 may include one or more blocks illustrating a method for avoiding collision between a plurality of inspection devices 101 using the collision avoidance system 105 illustrated in FIG. 1. The method 420 may be described in the general context of computer executable instructions. Generally, computer executable instructions can include routines, programs, objects, components, data structures, procedures, modules, and functions, which perform specific functions or implement specific abstract data types.

The order in which the method 420 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 421, the method 420 includes receiving, by the collision avoidance system 105, spatial information 211 of the area from each of a plurality of inspection devices 101 that are initialized for inspecting the area. In an embodiment, each of the plurality of inspection devices 101 may navigate across a plurality of hops and the spatial information 211 may be received at beginning of each of the plurality of hops. In an implementation, the spatial information 211 may be collected using one or more sensors 307 and image capturing devices 309 configured with each of the plurality of inspection devices 101.

At block 423, the method 420 includes creating, by the collision avoidance system 105, a current local map 213 for each of the plurality of inspection devices 101 based on the spatial information 211 of a current hop of the plurality of hops of each of the plurality of inspection devices 101. In an embodiment, the current local map 213 may indicate surrounding information related to a current location and/or a current hop of the plurality of inspection devices 101.

At block 425, the method 420 includes generating, by the collision avoidance system 105, a current global map 217 of the area by merging the current local map 213 of each of the plurality of inspection devices 101 with a previous global map 215 of the area. In an embodiment, the previous global map 215 may correspond to previous hops of the plurality of hops of each of the plurality of inspection devices 101. Further, generating the current global map 217 of the area may include identifying one or more adjacent local maps based on comparison among the current local map 213 corresponding to each of the plurality of inspection devices 101. Thereafter, a continuity score may be assigned for each of the one or more adjacent local maps based on visual similarity among the one or more adjacent local maps. Subsequently, the one or more adjacent local maps may be merged into the current global map 217, when the continuity score of the one or more adjacent local maps is greater than a threshold score, thereby generating the current global map 217 of the area.

At block 427, the method 420 includes localizing, by the collision avoidance system 105, each of the plurality of inspection devices 101 within the current global map 217 for determining a current location of each of the plurality of inspection devices 101. In an embodiment, localizing the plurality of inspection devices 101 may include determining a relative position/location of each of the plurality of inspection devices 101 with respect to each of the other inspection devices 101 in the area.

At block 429, the method 420 includes estimating, by the collision avoidance system 105, one or more sub-paths 219 for navigating each of the plurality of inspection devices 101 from the current hop to a subsequent hop of the plurality of hops. The one or more sub-paths 219 may be estimated by analysing the current global map 217 and the current location of each of the plurality of inspection devices 101 using a pre-trained path estimation model 229. In an embodiment, each of the one or more sub-paths 219 may be validated for eliminating possibility of collisions among the plurality of inspection devices 101 in the subsequent hop.

In an embodiment, validating each of the one or more sub-paths 219 may include estimating a future location of the plurality of inspection devices 101 based on analysis of the current location of the plurality of inspection devices 101 and the one or more sub-paths 219. Further, a possibility of collision between the plurality of inspection devices 101 at the future location of the plurality of inspection devices 101 may be determined using a pre-trained reinforcement model. Subsequently, the one or more sub-paths 219 having the possibility of collision may be eliminated to avoid collision between the plurality of inspection devices 101.

At block 431, the method 420 includes providing, by the collision avoidance system 105, each of the one or more sub-paths 219 to each of the plurality of inspection devices 101 for avoiding the collision between the plurality of inspection devices 101 during inspection of the area. In an embodiment, the one or more sub-paths 219 may be broadcasted to each of the plurality of inspection devices 101 for concurrently navigating the plurality of inspection devices 101.

In an embodiment, the method of inspecting the area using the plurality of inspection devices 101 comprises capturing, using the plurality of inspection devices 101, a plurality of images of a region to be inspected within the area. Further, the method comprises ranking each of the plurality of images based on one or more objects present in the plurality of images. In an embodiment, ranking may be performed using a pre-trained machine learning model. Subsequent to ranking, the method comprises combining one or more of the plurality of images into one or more inspection images based on the ranking. Finally, the method comprises displaying the one or more inspection images on a display unit 206 associated with the collision avoidance system 105 for inspecting the area.

Computer System

Figure 5:
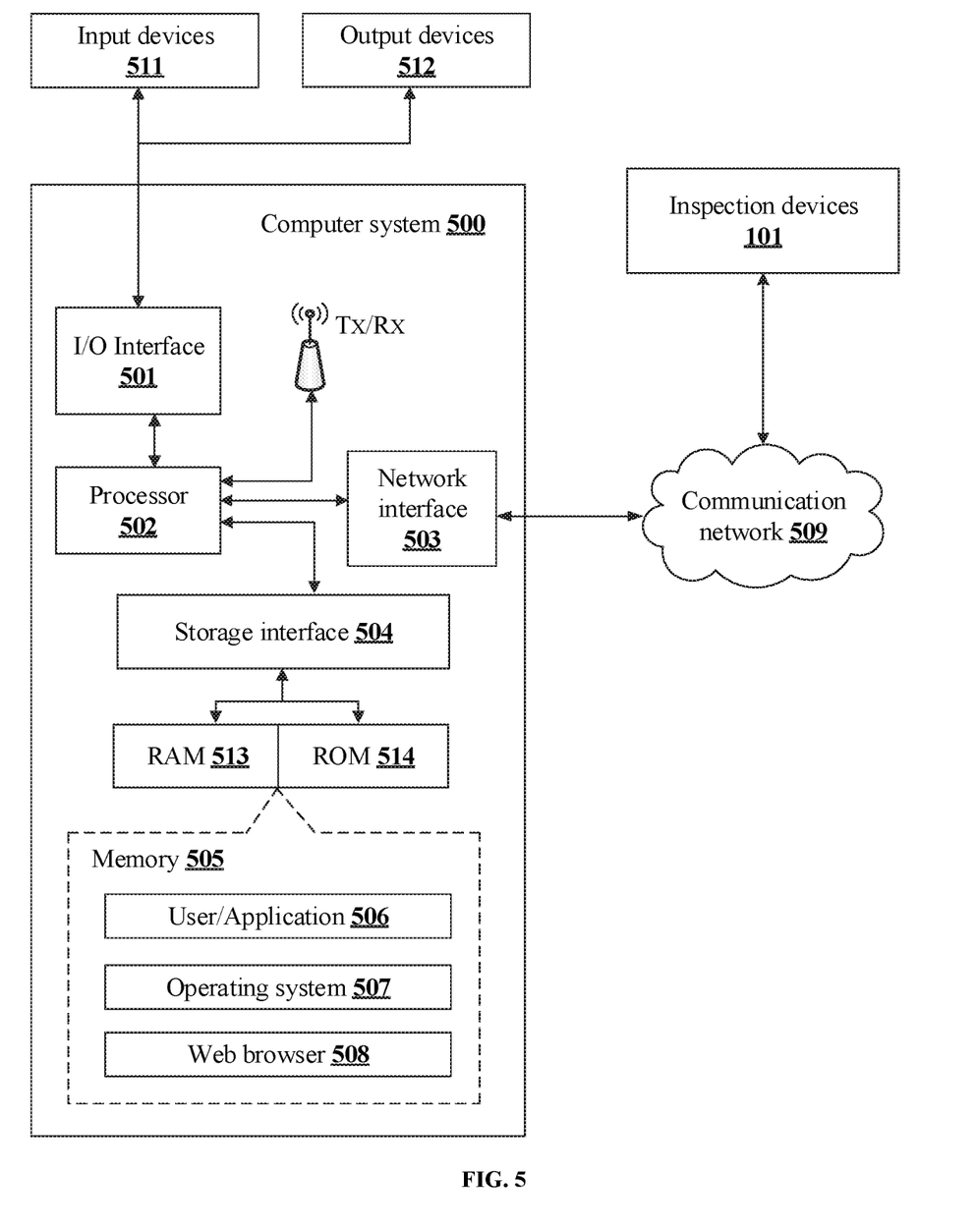
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the collision avoidance system 105 illustrated in FIG. 1, which may be used for avoiding collision between a plurality of inspection devices 101 during inspection of an area. The computer system 500 may include a central processing unit ("CPU" or "processor") 502. The processor 502 may comprise at least one data processor for executing program components for executing user- or system-generated business processes. A user may include a person, a product quality inspector, a storekeeper, a warehouse manager or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may communicate with the plurality of inspection devices 101 to receive spatial information 211 related to the area and to transmit one or more sub-paths 219 to each of the plurality of inspection devices 101.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein.

In an embodiment, the method of present disclosure helps in avoiding collision between plurality of inspection devices while the plurality of inspection devices are concurrently inspecting an area.

In an embodiment, the method of present disclosure may be used for accurate inspection of the area, since the present disclosure uses plurality of inspection devices, wherein each inspection device is equipped with one or more sensors and image capturing devices for thorough inspection of the area.

In an embodiment, the method of present disclosure significantly reduces the time required for inspecting a large inspection area, since plurality of automated inspection devices are used for inspecting the area.

In an embodiment, the method of present disclosure does not require prior knowledge about dimensions of an area to be inspected. Hence, the method of present disclosure may be used for inspecting a region of any dimension.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for avoiding collision between inspection devices during inspection of an area, the method comprising:

receiving, by a collision avoidance device, spatial information of the area from each of a plurality of inspection devices, initialized for inspecting the area, wherein each of the plurality of inspection devices are configured to navigate across a plurality of hops and the spatial information is received at beginning of each of the plurality of hops;

creating, by the collision avoidance device, a current local map for each of the plurality of inspection devices based on the spatial information of a current hop of the plurality of hops of each of the plurality of inspection devices;

generating, by the collision avoidance device, a current global map of the area by merging the current local map of each of the plurality of inspection devices with a previous global map of the area, wherein the previous global map corresponds to previous hops of the plurality of hops of each of the plurality of inspection devices;

localizing, by the collision avoidance device, each of the plurality of inspection devices within the current global map for determining a current location of each of the plurality of inspection devices;

estimating, by the collision avoidance device, one or more sub-paths for navigating each of the plurality of inspection devices from the current hop to a subsequent hop of the plurality of hops, by analysing the current global map and the current location of each of the plurality of inspection devices using a pre-trained path estimation model, wherein each of the one or more sub-paths are validated for eliminating possibility of collisions among the plurality of inspection devices in the subsequent hop; and providing, by the collision avoidance device, each of the one or more sub-paths to each of the plurality of inspection devices for avoiding the collision between the plurality of inspection devices during inspection of the area.

2. The method as claimed in claim 1, wherein the spatial information is collected using one or more sensors and image capturing devices configured with each of the plurality of inspection devices.

3. The method as claimed in claim 1, further comprising:

identifying, by the collision avoidance device, one or more adjacent local maps based on comparison among the current local map corresponding to each of the plurality of inspection devices;

assigning, by the collision avoidance device, a continuity score for each of the one or more adjacent local maps based on visual similarity among the one or more adjacent local maps; and merging, by the collision avoidance device, the one or more adjacent local maps into the current global map, when the continuity score of the one or more adjacent local maps is greater than a threshold score.

4. The method as claimed in claim 1, further comprising:
estimating, by the collision avoidance device, a future location of the plurality of inspection devices based on analysis of the current location of the plurality of inspection devices and the one or more sub-paths;
determining, by the collision avoidance device, a possibility of collision between the plurality of inspection devices at the future location of the plurality of inspection devices, using a pre-trained reinforcement model; and
eliminating, by the collision avoidance device, the one or more sub-paths having the possibility of collision.

5. The method as claimed in claim 1, further comprising:
ranking, by the collision avoidance device and using a pre-trained machine learning model, each of a plurality of images captured by the plurality of inspection devices based on one or more objects present in the plurality of images, wherein the plurality of images are of a region to be inspected within the area and the ranking is performed;
combining, by the collision avoidance device, one or more of the plurality of images into one or more inspection images based on the ranking; and
displaying, by the collision avoidance device, the one or more inspection images on a display unit.

6. A collision avoidance device, comprising:
a processor; and
a memory communicatively coupled to the processor and storing instructions that, when executed by the processor, cause the processor to:
receive spatial information of the area from each of a plurality of inspection devices, initialized for inspecting the area, wherein each of the plurality of inspection devices are configured to navigate across a plurality of hops and the spatial information is received at beginning of each of the plurality of hops;
create a current local map for each of the plurality of inspection devices based on the spatial information of a current hop of the plurality of hops of the each of the plurality of inspection devices;
generate a current global map of the area by merging the current local map of each of the plurality of inspection devices with a previous global map of the area, wherein the previous global map corresponds to previous hops of the plurality of hops of each of the plurality of inspection devices;
localize each of the plurality of inspection devices within the current global map for determining a current location of each of the plurality of inspection devices;
estimate one or more sub-paths for navigating each of the plurality of inspection devices from the current hop to a subsequent hop of the plurality of hops, by analysing the current global map and the current location of each of the plurality of inspection devices using a pre-trained path estimation model, wherein each of the one or more sub-paths are validated for eliminating possibility of collisions among the plurality of inspection devices in the subsequent hop; and
provide each of the one or more sub-paths to each of the plurality of inspection devices for avoiding the collision between the plurality of inspection devices during inspection of the area.

7. The collision avoidance device as claimed in claim 6, wherein the spatial information is collected using one or more sensors and image capturing devices configured with each of the plurality of inspection devices.

8. The collision avoidance device as claimed in claim 6, wherein the instructions, when executed by the processor, further cause the processor to:
identify one or more adjacent local maps based on comparison among the current local map corresponding to each of the plurality of inspection devices;
assign a continuity score for each of the one or more adjacent local maps based on visual similarity among the one or more adjacent local maps; and
merge the one or more adjacent local maps into the current global map, when the continuity score of the one or more adjacent local maps is greater than a threshold score.

9. The collision avoidance device as claimed in claim 6, wherein the instructions, when executed by the processor, further cause the processor to:
estimate a future location of the plurality of inspection devices based on analysis of the current location of the plurality of inspection devices and the one or more sub-paths;
determine a possibility of collision between the plurality of inspection devices at the future location of the plurality of inspection devices, using a pre-trained reinforcement model; and
eliminate the one or more sub-paths having the possibility of collision.

10. The collision avoidance device as claimed in claim 6, wherein the instructions, when executed by the processor, further cause the processor to:
rank, using a pre-trained machine learning model, each of a plurality of images captured by the plurality of inspection devices based on one or more objects present in the plurality of images, wherein the plurality of images are of a region to be inspected within the area and the ranking is performed;
combine one or more of the plurality of images into one or more inspection images based on the ranking; and
display the one or more inspection images on a display unit.

11. A non-transitory computer readable medium having stored thereon instructions for avoiding collision between inspection devices during inspection of an area comprising executable code which when executed by one or more processors, causes the one or more processors to:
receiving spatial information of the area from each of a plurality of inspection devices, initialized for inspecting the area, wherein each of the plurality of inspection devices are configured to navigate across a plurality of hops and the spatial information is received at beginning of each of the plurality of hops;
creating a current local map for each of the plurality of inspection devices based on the spatial information of a current hop of the plurality of hops of the each of the plurality of inspection devices;
generating a current global map of the area by merging the current local map of each of the plurality of inspection devices with a previous global map of the area, wherein the previous global map corresponds to previous hops of the plurality of hops of each of the plurality of inspection devices;

localizing each of the plurality of inspection devices within the current global map for determining a current location of each of the plurality of inspection devices;

estimating one or more sub-paths for navigating each of the plurality of inspection devices from the current hop to a subsequent hop of the plurality of hops, by analysing the current global map and the current location of each of the plurality of inspection devices using a pre-trained path estimation model, wherein each of the one or more sub-paths are validated for eliminating possibility of collisions among the plurality of inspection devices in the subsequent hop; and providing each of the one or more sub-paths to each of the plurality of inspection devices for avoiding the collision between the plurality of inspection devices during inspection of the area.

12. The non-transitory computer-readable medium of claim 11, wherein the spatial information is collected using one or more sensors and image capturing devices configured with each of the plurality of inspection devices.

13. The non-transitory computer-readable medium of claim 11, wherein the executable code, when executed by the processors, further causes the processors to:

identify one or more adjacent local maps based on comparison among the current local map corresponding to each of the plurality of inspection devices;

assign a continuity score for each of the one or more adjacent local maps based on visual similarity among the one or more adjacent local maps; and merge the one or more adjacent local maps into the current global map, when the continuity score of the one or more adjacent local maps is greater than a threshold score.

14. The non-transitory computer-readable medium of claim 11, wherein the executable code, when executed by the processors, further causes the processors to:

estimate a future location of the plurality of inspection devices based on analysis of the current location of the plurality of inspection devices and the one or more sub-paths;

determine a possibility of collision between the plurality of inspection devices at the future location of the plurality of inspection devices, using a pre-trained reinforcement model; and eliminate the one or more sub-paths having the possibility of collision.

15. The non-transitory computer-readable medium of claim 11, wherein the executable code, when executed by the processors, further causes the processors to:

rank, using a pre-trained machine learning model, each of a plurality of images captured by the plurality of inspection devices based on one or more objects present in the plurality of images, wherein the plurality of images are of a region to be inspected within the area and the ranking is performed;

combine one or more of the plurality of images into one or more inspection images based on the ranking; and display the one or more inspection images on a display unit.

* * * * *